(12) United States Patent
Sun (10) Patent No.: US 7,769,201 B2
(45) Date of Patent: Aug. 3, 2010

(54) METHOD FOR ANALYZING MULTI-LAYER MATERIALS FROM ONE-SIDED PULSED THERMAL IMAGING

(75) Inventor: Jiangang Sun, Westmont, IL (US)

(73) Assignee: UChicago Argonne, LLC, Chicago, IL (US)

( * ) Notice: Subject to any disclaimer, the term of this patent is extended or adjusted under 35 U.S.C. 154(b) by 988 days.

(21) Appl. No.: 11/452,052

(22) Filed: Jun. 13, 2006

(65) Prior Publication Data

US 2007/0299628 A1 Dec. 27, 2007

(51) Int. Cl.
*G06K 9/00* (2006.01)
(52) U.S. Cl. .................... 382/100; 382/118; 850/50
(58) Field of Classification Search ............... 382/118; 850/50
See application file for complete search history.

(56) References Cited

U.S. PATENT DOCUMENTS

| | | | |
|---|---|---|---|
| 3,453,145 A * | 7/1969 | Duddy | 429/244 |
| 4,632,865 A * | 12/1986 | Tzur | 428/304.4 |
| 6,517,236 B2 | 2/2003 | Sun et al. | |
| 6,542,849 B2 | 4/2003 | Sun | |
| 6,712,502 B2 * | 3/2004 | Zalameda et al. | 374/5 |
| 7,193,210 B2 * | 3/2007 | Garber et al. | 250/330 |
| 7,451,657 B2 * | 11/2008 | Goldfine et al. | 73/760 |
| 2006/0222047 A1 * | 10/2006 | Reading | 374/120 |

* cited by examiner

*Primary Examiner*—Matthew C Bella
*Assistant Examiner*—Dennis Rosario
(74) *Attorney, Agent, or Firm*—Joan Pennington (57) ABSTRACT

A method, apparatus, and computer program product provides automated analysis of thermal imaging data for multi-layer materials based upon a theoretical model of a multi-layer material system, which is solved numerically. The computer-implemented method effectively processes the volume heating effect for thermal barrier coatings (TBCs), since quantitative evaluation of TBC thickness and conductivity is particularly important. TBC thickness is a processing parameter and required to be monitored. TBC conductivity is a measure of TBC quality because it is directly related with TBC density/porosity, microcracking and interface cracks. Because this method is an imaging technology, it can be used for fast and 100% area inspection of larger TBC surfaces, such as combustor liners.

18 Claims, 10 Drawing Sheets

METHOD FOR ANALYZING MULTI-LAYER MATERIALS FROM ONE-SIDED PULSED THERMAL IMAGING

CONTRACTUAL ORIGIN OF THE INVENTION

The United States Government has rights in this invention pursuant to Contract No. W-31-109-ENG-38 between the United States Government and Argonne National Laboratory.

FIELD OF THE INVENTION

The present invention relates to an improved method for analyzing multilayer materials from one-sided pulsed thermal imaging, and more particularly to a method, apparatus, and computer program product or software for analyzing multilayer materials from one-sided pulsed thermal imaging.

DESCRIPTION OF THE RELATED ART

Pulsed thermal imaging is widely used for nondestructive evaluation (NDE) of advanced materials and components. The premise is that the flow of heat from the surface of a solid is affected by internal flaws such as debonds, voids or inclusions.

For example, U.S. Pat. No. 6,517,236 issued Feb. 11, 2003 to Jiangang Sun, William A. Ellingson, and Chris M. Deemer discloses a method and apparatus for automated non-destructive evaluation (NDE) thermal imaging tests of combustor liners and other products. The apparatus for automated NDE thermal imaging testing of a sample includes a flash lamp positioned at a first side of the sample. An infrared camera is positioned near a second side of the sample. A linear positioning system supports the sample. A data acquisition and processing computer is coupled to the flash lamp for triggering the flash lamp. The data acquisition and processing computer is coupled to the infrared camera for acquiring and processing image data. The data acquisition and processing computer is coupled to the linear positioning system for positioning the sample for sequentially acquiring image data.

U.S. Pat. No. 6,542,849 issued Apr. 1, 2003 to Jiangang Sun discloses a method and apparatus for determining the thickness of a sample and defect depth using thermal imaging in a variety of plastic, ceramic, metal and other products. A pair of flash lamps is positioned at a first side of the sample. An infrared camera is positioned near the first side of the sample. A data acquisition and processing computer is coupled to the flash lamps for triggering the flash lamps. The data acquisition and processing computer is coupled to the infrared camera for acquiring and processing thermal image data. The thermal image data are processed using a theoretical solution to analyze the thermal image data to determine the thickness of a sample and defect depth.

Material systems can be roughly divided into single-layer and multi-layer materials. A single-layer material has relatively uniform thermal properties and most composite materials can be considered to be single layer because discontinuities within the material are in microscopic length scales that are much smaller than the component dimensions.

A multi-layer material has distinct layers of materials with different thermal properties. For example, one typical 3-layer material system is a thermal barrier coating (TBC), which consists of a top ceramic coat, a bond coat, and a metallic substrate.

Thermal imaging methods to analyze single-layer materials are well developed. However, a need exists for a method for analyzing multi-layer materials. A method for analyzing multi-layer materials has not been developed because of the complexity of the material systems and the lack of an analytical solution.

Analytical solutions for two-layer or three-layer materials have been reported in the literature and methods based on simplification of these theories were also reported. Nevertheless, a general method and automated data analysis algorithm for multi-layer materials is lacking.

Principal aspects of the present invention are to provide a method, apparatus, and computer program product for analyzing multilayer materials from one-sided pulsed thermal imaging.

Other important aspects of the present invention are to provide such method, apparatus, and computer program product for analyzing multilayer materials from one-sided pulsed thermal imaging substantially without negative effect and that overcome some of the disadvantages of prior art arrangements.

SUMMARY OF THE INVENTION

In brief, a computer-implemented method, apparatus, and computer program product are provided for automated analysis of thermal imaging data for multi-layer materials based upon a theoretical model of a multi-layer material system, which is solved numerically.

A plurality of model solutions is stored. Experimental thermal imaging data is acquired. A model solution is fitted with the experimental thermal imaging data by adjusting the model parameters, including thermal properties and thickness of each layer. When the model result matches the experimental data, the correct parameters for the multilayer material are determined.

For example, least-square fitting of a numerical solution with experimental thermal imaging data is used to determine thermal properties including conductivity and heat capacity and geometrical parameters including the thickness in one or several layers of the multi-layer material system.

In accordance with features of the invention, the computer-implemented method effectively processes the volume heating effect for thermal barrier coatings (TBCs), and quantitative evaluation of TBC thickness and conductivity is particularly important. TBC thickness is a processing parameter and is required to be monitored. TBC conductivity is a measure of TBC quality because it is directly related with TBC density/porosity, microcracking and interface cracks. Because this method is an imaging technology, it can be used for fast and 100% area inspection of larger TBC surfaces, such as combustor liners.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a general method and numerical algorithm are provided for automated analysis of thermal imaging data for multi-layer materials. The method and numerical algorithm are based upon a theoretical model of a multi-layer material system, which is solved numerically. Least-square fitting of the numerical solution with experimental data is used to determine thermal properties, such as conductivity and heat capacity, and geometrical parameters, such as thickness, in one or several layers of the multi-layer material system.

Figure 1:
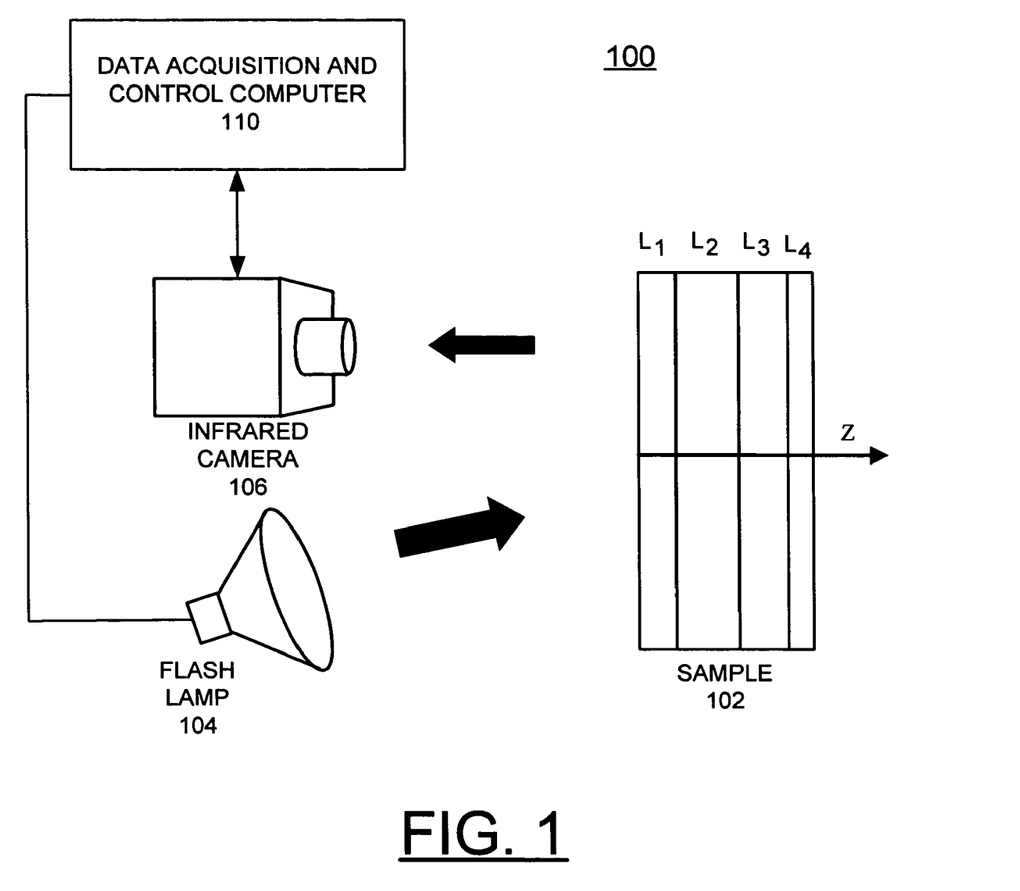
FIG. 1 is a diagram illustrating a thermal imaging apparatus for implementing a method for analyzing multilayer materials in accordance with the preferred embodiment.

Having reference now to the drawings, FIG. 1 illustrates a thermal imaging apparatus for implementing methods for thermal-image-analysis for multilayer material systems in accordance with the preferred embodiment and generally designated by the reference numeral 100, such as a sample 102 including such as a four layers $L_1$, $L_2$, $L_3$, $L_4$. Thermal imaging system 100 includes a flash lamp 104 providing a pulse of thermal energy for heating a first surface of the sample 102. Thermal imaging system 100 includes, for example, a high-resolution and high-sensitivity infrared camera 106, for example, with 256×256 pixel focal plane array of infrared sensors. Infrared camera 106 is positioned on the same side of the sample 102 as the flash lamps 104. Thermal imaging system 100 includes a data acquisition and control computer 110 for implementing methods for analyzing multilayer materials in accordance with the preferred embodiment.

First theoretical background for thermal imaging of single-layer materials is reviewed. Because thermal imaging is inherently a two-dimensional (2D) method (it images the 2D specimen surface), theoretical development is usually carried out in 1D, in axial or depth direction, models. The temperature/time response on a surface position, a pixel in a 2D image, reflects the variation of material properties (and/or defects) under that surface position. By analyzing the temperature/time response, the material property and depth of various subsurface layers under that pixel can be determined. The final thermal imaging results for all pixels are usually presented in image forms; the value at each pixel represents a particular physical parameter such as thermal conductivity or depth that was determined from the temperature response analysis. To understand the thermal responses due to material thermal and optical properties and depth, heat conduction in a single-layer material is examined first.

The 1D governing equation for heat conduction in a solid material is:

$$\rho c \frac{\partial T}{\partial t} = \frac{\partial}{\partial z}\left(k \frac{\partial T}{\partial z}\right), \quad (1)$$

where T(z,t) is temperature, ρ is density, c is specific heat, k is thermal conductivity, t is time, z is coordinate in the depth direction, and z=0 is the surface that receives flash heating. It is noted that Eq. (1) contains only two independent thermal parameters, the heat capacity ρc and the thermal conductivity k, both are normally constant in each material layer.

During flash thermal imaging, an impulse energy Q is applied on surface z=0 at t=0. An ideal condition is assumed for the following derivation, i.e., (1) flash is instantaneous or flash duration is zero and (2) flash heat is absorbed at a surface layer of zero thickness. Other than the flash heating, all surfaces are assumed to be insulated at all times. After the surface at z=0 receives initial heating and reaches a high temperature (theoretically to infinity with the instantaneous heating), heat conduction takes place in the z (or depth) direction. For a semi-infinite material (0≦z<∞), the solution of surface temperature from the governing equation (1) under the ideal condition is:

$$T(t) = T(z=0, t) = \frac{Q}{(\rho c k \pi t)^{1/2}} \quad (2)$$

In log-log scale, Eq. (2) is expressed as:

$$\ln T = \ln\left[\frac{Q}{(\rho c k \pi)^{1/2}}\right] - \frac{1}{2}\ln t. \quad (3)$$

Equation (3) indicates that there is a linear relationship between lnT and lnt with a constant slope of −0.5.

For a finite-thickness plate (0≦z≦L), the surface temperature solution from the governing Eq. (1) is:

$$T(t) = T(z=0, t) = \frac{Q}{\rho c L}\left[1 + 2\sum_{n=1}^{\infty} \exp\left(-\frac{n^2 \pi^2}{L^2}\alpha t\right)\right], \quad (4)$$

where α (=k/ρc) is thermal diffusivity.

Figure 2:
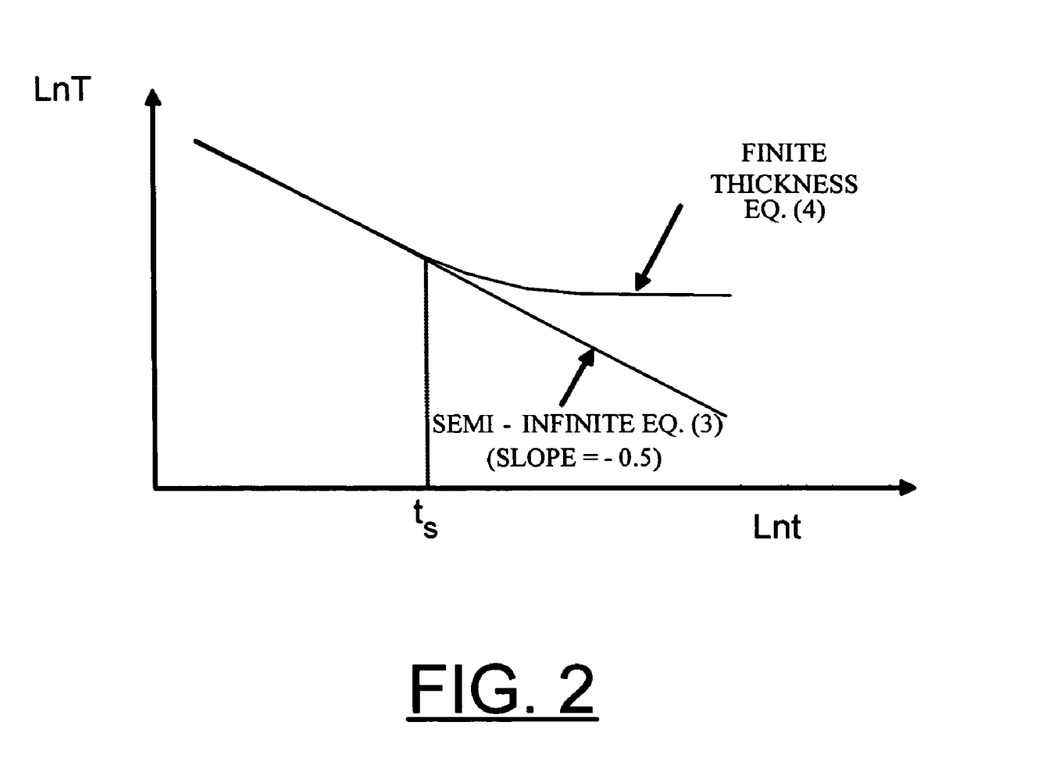
FIG. 2 is a graph illustrating surface temperature profiles from semi-infinite material Eq. (3) and finite-thickness material Eq. (4) in log-log scale in accordance with the preferred embodiment.

FIG. 2 illustrates the temperature profiles from Eq. (3) and Eq. (4) in log-log scale. It is seen that both solutions follow the −0.5 slope of temperature decay in the initial period. For the finite-thickness plate, Eq. (4), the heat transfer rate (or temperature slope) reduces and eventually approaches to zero when heat conduction reaches the back surface (z=L). The time $t_s$ when Eq. (4) deviates from Eq. (3) is related to the thickness of the plate.

When deriving solution Eqs. (3) and (4), two ideal conditions were assumed, i.e., (1) flash is instantaneous and (2) flash heating is absorbed on surface. These conditions are not accurate for thin TBC material system where the effects of finite flash duration and volume heating are significant. In the following, these two conditions are examined for single-layer materials.

Most pulsed thermography systems utilize photographic flash lamps to provide pulsed heating. These flash lamps typically have a flash duration of several milli-seconds. Although this duration is considered short enough for testing most samples, it has significant effect for thin or high-diffusivity materials that have fast thermal response. This effect was analyzed and it was found that, for a typical flash lamp, the flash intensity rises very quickly (~0.1 ms) but decays slowly (several milli-seconds). By neglecting the rise time, flash intensity decay can be modeled by: $I(t)=Ae^{-2t/\tau}$, where A is a constant and $\tau$ is a characteristic flash duration. The solution of surface temperature for a finite-thickness plate under a finite flash duration is:

$$T(t) = \frac{Q}{\rho c L}\left[1 - e^{-\frac{2t}{\tau}} + 2\sum_{n=1}^{\infty}\left(\frac{n^2\pi^2\tau\alpha}{2L^2} - 1\right)^{-1}\left(e^{-\frac{2t}{\tau}} - e^{-\frac{n^2\pi^2\alpha}{L^2}t}\right)\right] \quad (5)$$

Solution Eq. (5) approaches Eq. (4) when flash duration reduces to zero, i.e., $\tau \to 0$.

Figure 3:
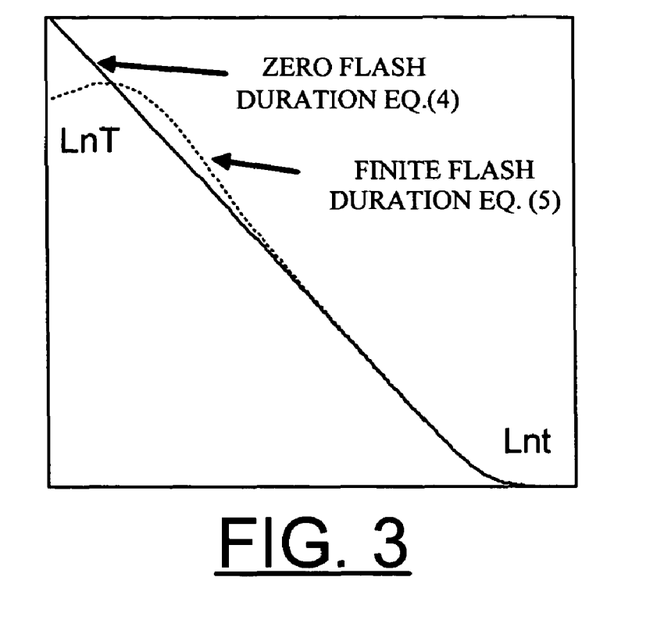
FIGS. 3 and 4 are graphs illustrating the effect of finite flash duration on surface temperature variation in accordance with the preferred embodiment.
Figure 4:
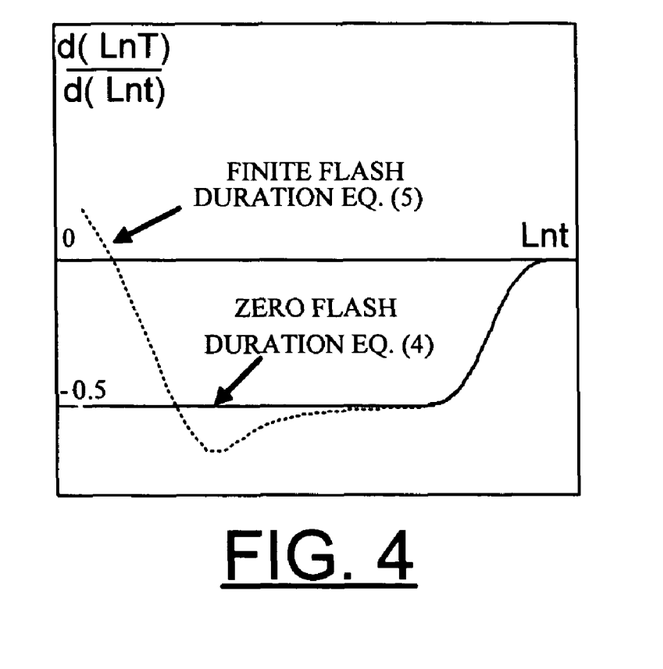

FIGS. 3 and 4 shows the effect of finite flash duration on surface temperature variation. The slope of temperature decay varies in early times and eventually approaches the −0.5 slope.

Considering volume heat absorption effect, the assumption for surface heat absorption is generally true for optically opaque materials. When the material is translucent, such as oxide ceramics or TBC coating, flash radiation may penetrate deeper inside the material and absorbed within a finite-thickness layer, or volume heating occurs. Because penetrated radiation intensity decays exponentially with depth, the volume heating can be modeled by a temperature distribution that exponentially decreases with depth. Heat conduction then proceeds from this initial temperature distribution. Based on this model, the initial temperature profile can be defined as: $T(z,0)=Be^{-az}$, where B is a constant and a is an absorption coefficient. The surface temperature solution then becomes:

$$T(t) = \frac{Q}{\rho c L}\left[1 - e^{-aL} + 2\sum_{n=1}^{\infty}\frac{1-(-1)^n e^{-aL}}{1+\left(\frac{n\pi}{aL}\right)^2}\exp\left(-\frac{n^2\pi^2\alpha}{L^2}t\right)\right]. \quad (6)$$

As $a \to \infty$, this solution approaches the surface-heat-absorption solution Eq. (4).

Figure 5:
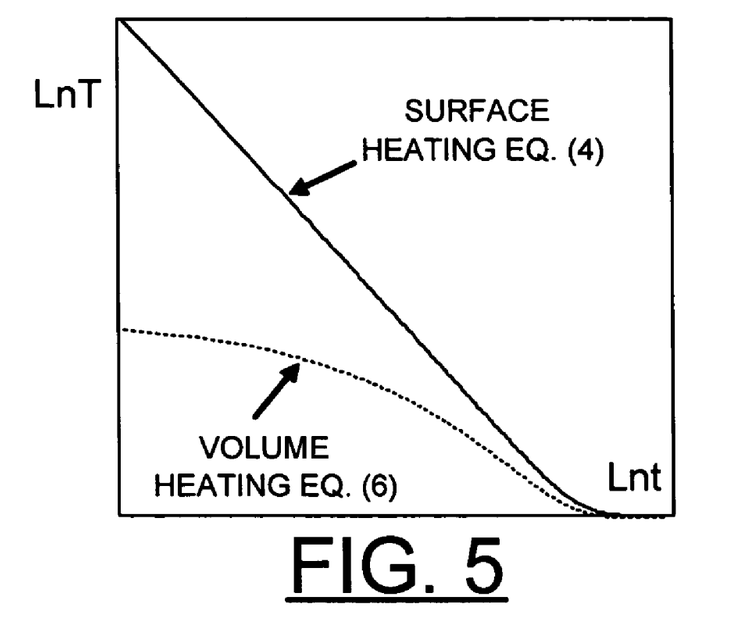
FIGS. 5 and 6 are graphs illustrating surface-heat-absorption for a finite-thickness plate illustrating that volume heat absorption changes the initial slope of surface temperature decay in accordance with the preferred embodiment.
Figure 6:
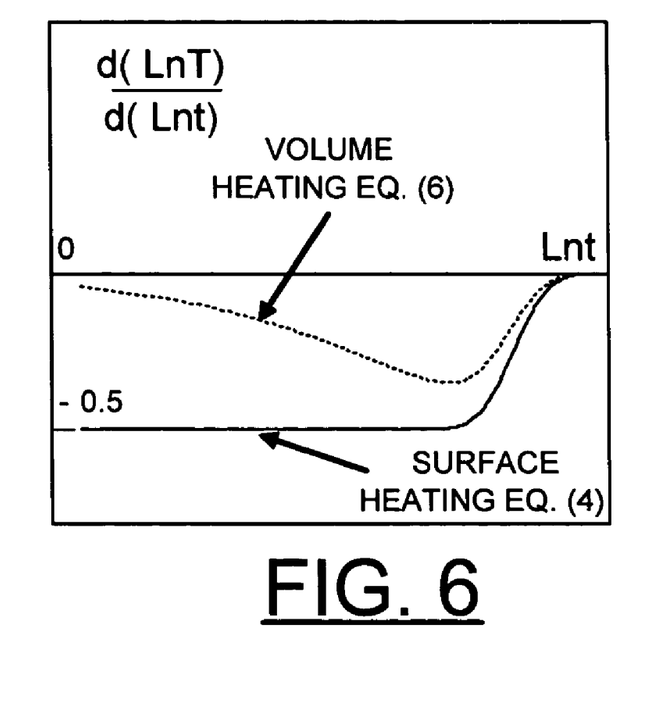

FIGS. 5 and 6 compare the solution Eqs. (4) and (6). It is seen that volume heat absorption changes the initial slope of surface temperature decay. The amount of decrease in initial slope value is related to the optical absorption coefficient of the material.

Considering thermal imaging analysis for multi-layer materials, parameters in each layer include: conductivity k, heat capacity $\rho c$, layer thickness L, and, for translucent materials, the absorption coefficient a. In comparison, only one dimensionless parameter ($\alpha t/L^2$) controls complete heat transfer process in single-layer materials. Despite of the complexities, surface temperature decay for multi-layer materials under pulsed thermography conditions has been well understood.

Figure 7:
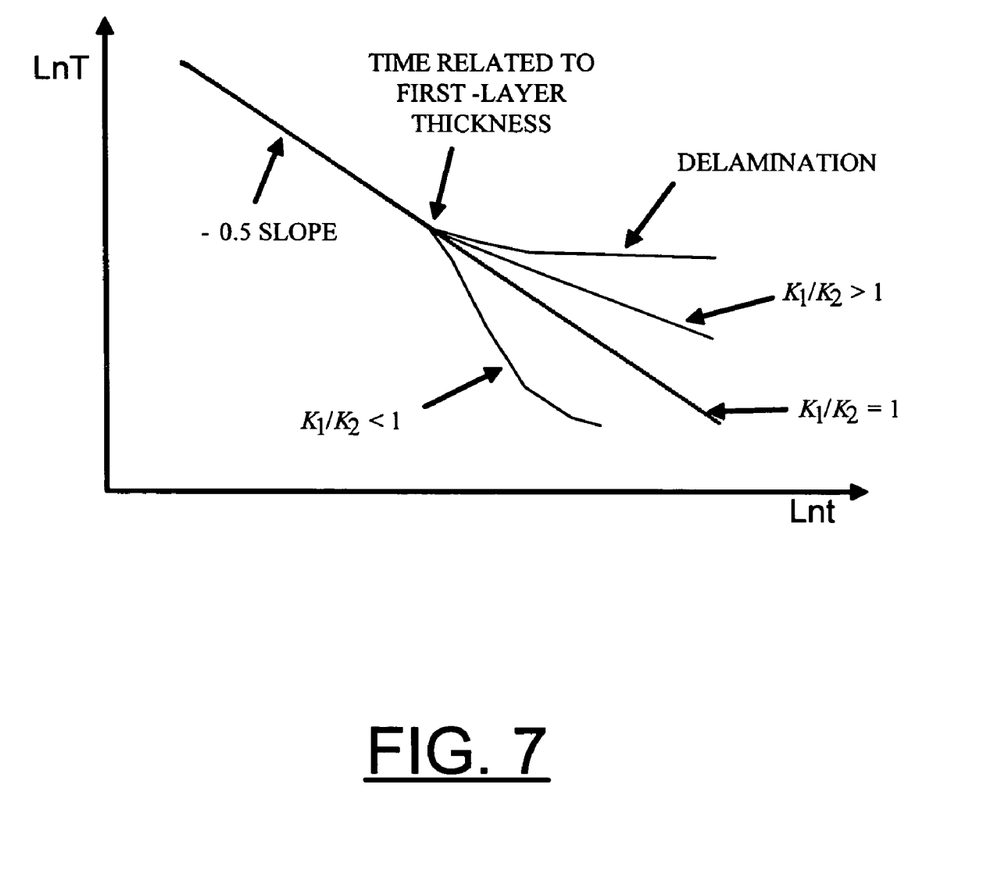
FIG. 7 is a graph illustrating surface temperature decay from pulsed thermal imaging for a 2-layer material system in accordance with the preferred embodiment.

Referring also to FIG. 7, for a 2-layer opaque material, depending on the ratio of heat conductivities between the first and second layers, $k_1/k_2$, the expected surface temperature decay is illustrated in FIG. 7; which indicates that when $k_1/k_2<1$ the (absolute) magnitude of the slope is larger than 0.5, and when $k_1/k_2>1$ the (absolute) slope amplitude is smaller than 0.5. The time instant where slope changes is related to the thickness of the $1^{st}$ layer.

For multi-layer materials, direct solution of the heat conduction equation (1) is possible, and analytical solutions for two-layer and three-layer materials have been derived. However, these conventional solutions are difficult to be used for general applications because a large number of eigenfunctions are involved.

In accordance with features of the invention, new robust and fast methods are provided to solve multi-layer material systems and to determine the distributions of material property and thickness in various layers. In this invention, a method based on numerical solution and least-square fitting schemes is provided for this purpose.

In accordance with features of the invention, a general method and numerical algorithm are provided for automated analysis of thermal imaging data for multi-layer materials. It is based on a theoretical model of a multi-layer material system which is solved numerically. The Crank-Nicolson algorithm is used to discretize the governing equation (1). With constant thermal properties and uniform spatial grids, Eq. (1) is expressed as:

$$\frac{T_j^{n+1} - T_j^n}{\Delta t} = \frac{\alpha}{2}\left[\frac{(T_{j+1}^{n+1} - 2T_j^{n+1} + T_{j-1}^{n+1}) + (T_{j+1}^n - 2T_j^n + T_{j-1}^n)}{(\Delta z)^2}\right] \quad (7)$$

where the superscript n denotes the time step and the subscript j denotes grid number. The Crack-Nicolson algorithm has $2^{nd}$-order accuracy in both time and space and, because it's an implicit algorithm, is unconditionally stable so grid size and time step can be arbitrarily chosen. In addition, because a 1D model is used in this method, the numerical solution matrix is tri-diagonal, so it can be easily and efficiently solved.

The Crank-Nicolson algorithm or scheme implemented in the accompanying software is formulated with variable time steps and nonuniform grid sizes in different material layers. The formulation also incorporates finite flash duration and volume heat absorption effects. The numerical formulation is derived based on the discretization of the multi-layer system which is provided from the input, for example, each layer can be discretized into tens to thousands of grids. The time steps are automatically chosen from the inputted experimental thermal-imaging data to be analyzed. The numerical formulation is then solved to provide numerical solutions of surface temperature based on the inputted layer dimension and thermal properties.

The numerical solutions are fitted with the experimental data by least-square minimization to determine unknown parameters in the multi-layer material system. Parameters in one or several layers can be determined simultaneously. For a TBC system, the most interest parameters are the thickness, thermal conductivity, and absorption coefficient of the ceramic coating in the first layer. When a numerical result matches the experimental data (measured surface temperature decay from pulsed thermal imaging test), the correct parameters for the multi-layer material are determined. This least-square fitting process is carried out for each pixel within the 2D thermal imaging data, and the fitted parameters can be expressed in 2D images of the individual parameters.

In accordance with features of the invention, in order to save computation time, numerical solutions for unknown parameters within specified limiting ranges are calculated first and stored in computer memory. During the fitting process, these solutions are interpolated to obtain intermediate parameter values within the limiting ranges.

Figure 8:
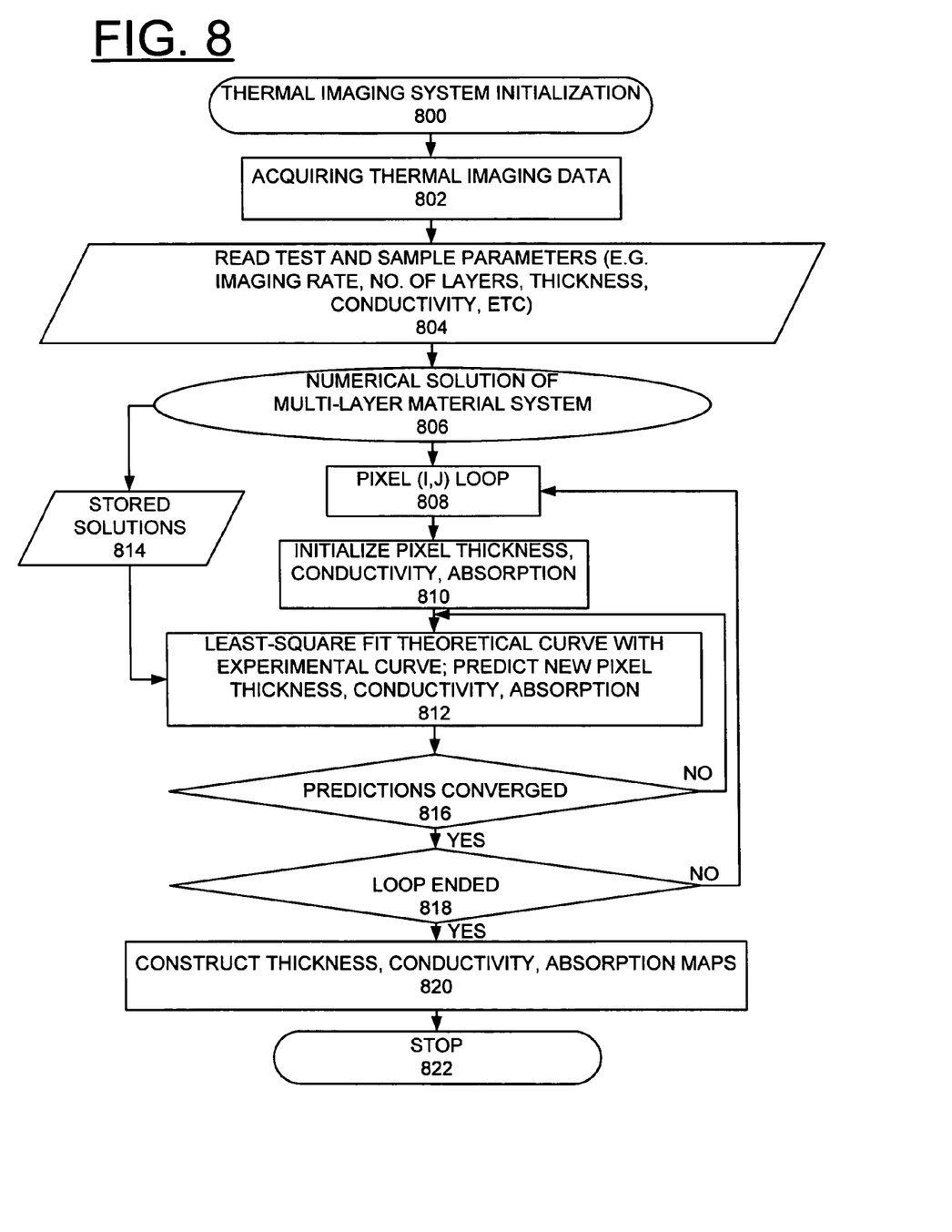
FIG. 8 is a flow chart illustrating exemplary steps for analyzing thermal imaging data for multi-layer TBC material systems in accordance with the preferred embodiment.

Referring now to FIG. 8, there are shown exemplary software steps for analyzing thermal imaging data for multi-layer TBC material systems. Image data processing is fully automated to simultaneously determine the distributions and images of TBC thickness, conductivity, and absorption coefficient.

As indicated in a block 800, first initialization of the thermal imaging system is preformed and thermal imaging data is acquired as indicated in a block 802. Multiple test and sample parameters are read, for example, imaging rate, number of layers, thickness, conductivity, and the like, as indicated in a block 804. A numerical solution of the multi-layer material system is processed as indicated in a block 806. A pixel (i, j) loop is obtained as indicated in a block 808, then the pixel thickness, conductivity, and absorption are initialized as indicated in a block 810. As indicated in a block 812, a least-square fit of a theoretical curve obtained from stored solutions as indicated in a block 814 with an experimental curve is performed and new pixel thickness, conductivity, and absorption is predicted. As indicated in a decision block 816, it is determined whether the predictions converged. If not then a next least-squared fit is performed at block 812. When the predictions converged, then checking whether the loop ended as indicated in a decision block 818. When the loop has not ended, then a next pixel (i, j) loop is obtained at block 808 and the processing continues with the next pixel (i, j) loop. When the loop has ended, then thickness, conductivity, and absorption maps are constructed as indicated in a block 820. This completes the analysis of thermal imaging data for the multi-layer TBC material system as indicated in a block 822.

Demonstration of method of the invention for analysis of TBC systems is provided. TBC coating is an important thermal protection material for metallic components used in high-temperature applications. A TBC material system consists of three layers: the top ceramic coat, the intermediate bond coat, and the metallic substrate. The quality and adhesion of the top coat (or TBC) to the substrate is important to achieve its thermal protection function.

Quantitative evaluation of TBC thickness and conductivity is particularly important. TBC thickness is a processing parameter that needs to be monitored. TBC conductivity is a measure of TBC quality because it is directly related to TBC density/porosity, micro-cracking, and interface cracks. Correlation of TBC conductivity with service condition may lead to a quantitative method to predict TBC degradation and spallation. Because TBC material system has large thermal-conductivity disparity between TBC and substrate, thermal imaging is the preferred NDE method because it is sensitive to thermal properties. In addition, thermal imaging is an imaging technology, so it can be used for fast and 100%-area inspection of larger TBC surfaces such as combustor liners and turbine blades. By determining TBC conductivity variation with service time, this method can also be used for health monitoring of TBC materials.

TBC translucency has been a major obstacle for quantitative thermal imaging analysis. Conventional thermal imaging methods cannot be used directly; instead, they require the application of a black paint on the TBC surface to eliminate the volume heating effect. In this invented method, volume heating is explicitly modeled by an absorption parameter, which is also automatically determined by the least-square fitting. Therefore, this method can also analyze TBCs with different levels of surface contamination that affects the TBC absorption property.

In the following, several numerical solutions for a postulated 2-layer TBC system are presented to illustrate the sensitivity of this invented multi-layer method for determining TBC thickness, conductivity, and optical absorption coefficient. The parameters used in the calculations are listed in Table 1.

TABLE 1

Postulated TBC parameters used in numerical solutions

| Layer | L (mm) | a (mm$^{-1}$) | k (W/m-K) | $\rho c$ (J/cm$^3$-K) |
|---|---|---|---|---|
| TBC | 0.2 | 4 | 1 | 3 |
| Substrate | 2.5 | n/a | 8 | 4 |

Figure 9:
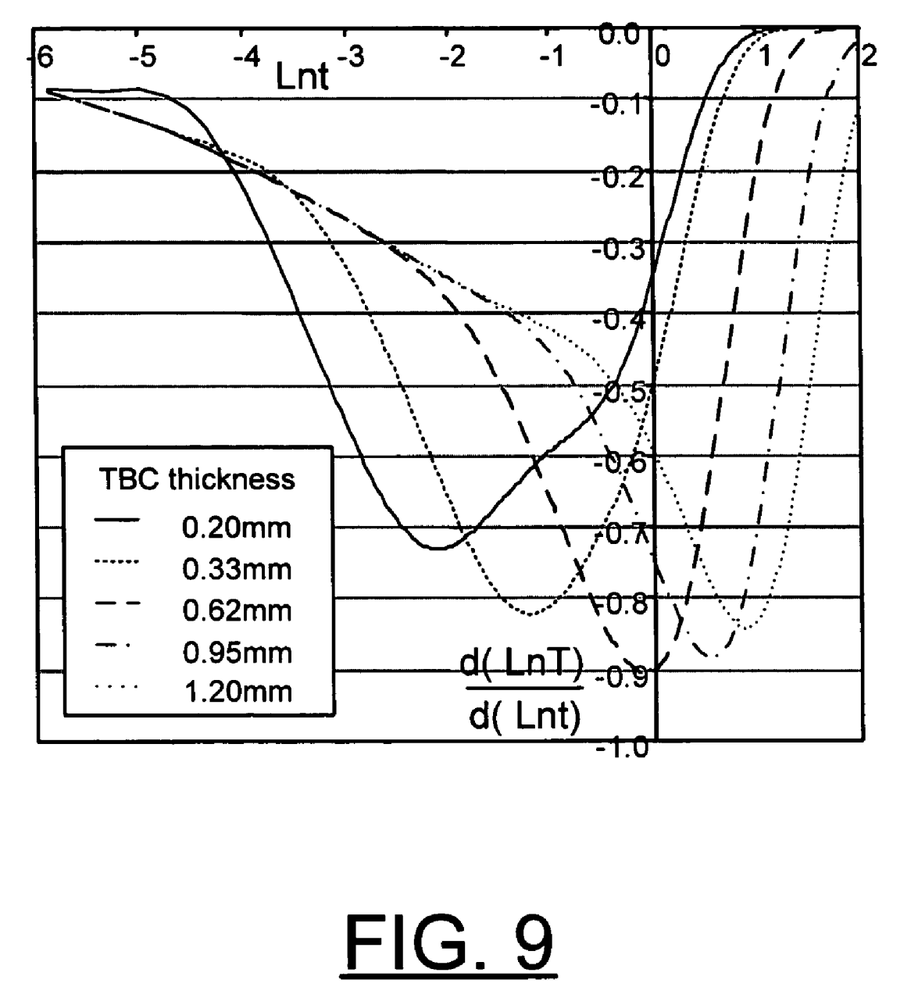
FIG. 9 is a graph illustrating calculated surface-temperature slope d(lnT)/d(lnt) as function of time (in log-log scale) for TBCs of different thickness in accordance with the preferred embodiment.

FIG. 9 shows calculated numerical results for TBCs of different thicknesses (except a TBC conductivity of 1.3 W/m-K was used, all other parameters are same as those listed in Table 1). It is seen that the surface-temperature slope d(InT)/d(Int) initially follows straight lines with (absolute) magnitudes below 0.5, which clearly illustrates the translucency property of the TBC coat, for example, see also FIGS. 5, 6, and 11. The magnitude is larger than 0.5 when heat transfer reaches the substrate that has a higher thermal conductivity. The time when the slope change occurs is related to the TBC thickness.

Figure 10:
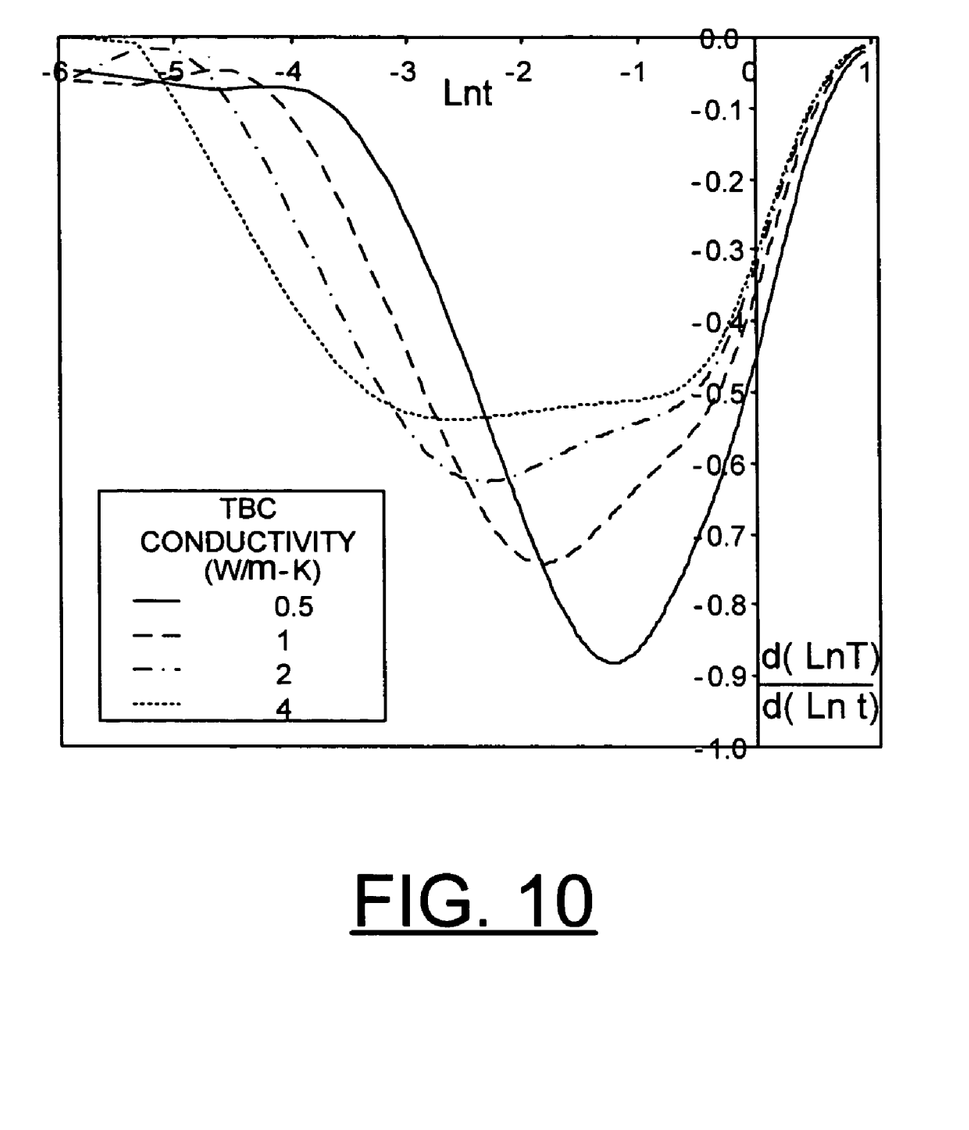
FIG. 10 is a graph illustrating calculated numerical results for TBCs with different thermal conductivities in accordance with the preferred embodiment.

FIG. 10 shows calculated numerical results for TBCs with different thermal conductivities with all other parameters are same as those listed in Table 1. It is seen that the surface-temperature slope is very sensitive to the change of thermal conductivity of the TBC layer; a lower TBC conductivity will result in a higher peak magnitude of the slope.

Figure 11:
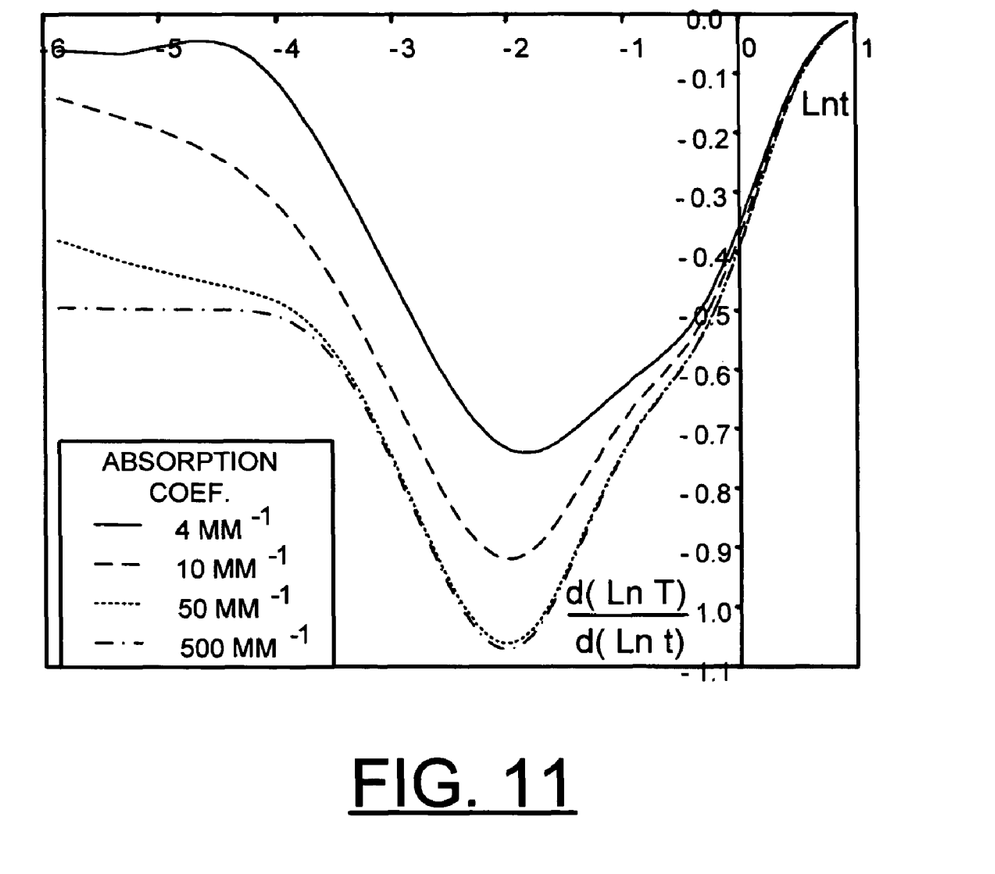
FIG. 11 is a graph illustrating calculated surface-temperature slope as function of time (in log-log scale) for TBCs with various optical absorption coefficients in accordance with the preferred embodiment.

FIG. 11 shows the calculated numerical results for TBCs with different optical absorption coefficients, other parameters are same as those listed in Table 1. It is evident that the initial surface temperature is very sensitive to the TBC absorption coefficient. When the absorption coefficient approaches infinity (for opaque materials), the initial surface-temperature slope becomes −0.5. Because TBC absorption depends on TBC material composition and structure as well as TBC surface conditions, such as contamination, direct determination of the TBC absorption will eliminate this effect from the calculation of TBC thickness and conductivity, and allow for accurate prediction of the TBC thickness and conductivity. Therefore, this invented method can be used for thermal analysis of as-processed TBCs that have uniform optical absorption as well as used TBCs that may have surface contaminations.

An as-processed TBC specimen with four sections of thickness is used to demonstrate the performance of this new method. It consists of a nickel-based substrate of 2.5 mm thick and a TBC layer with its surface being divided into 4 sections having respective nominal thickness of 0.33, 0.62, 0.95, and 1.20 mm. Because this TBC specimen is as-processed, its thermal conductivity and optical absorption coefficient are expected to be uniform. Pulsed thermal imaging data was obtained for a time duration of 13 seconds at an imaging speed of 145 Hz.

Figure 12:
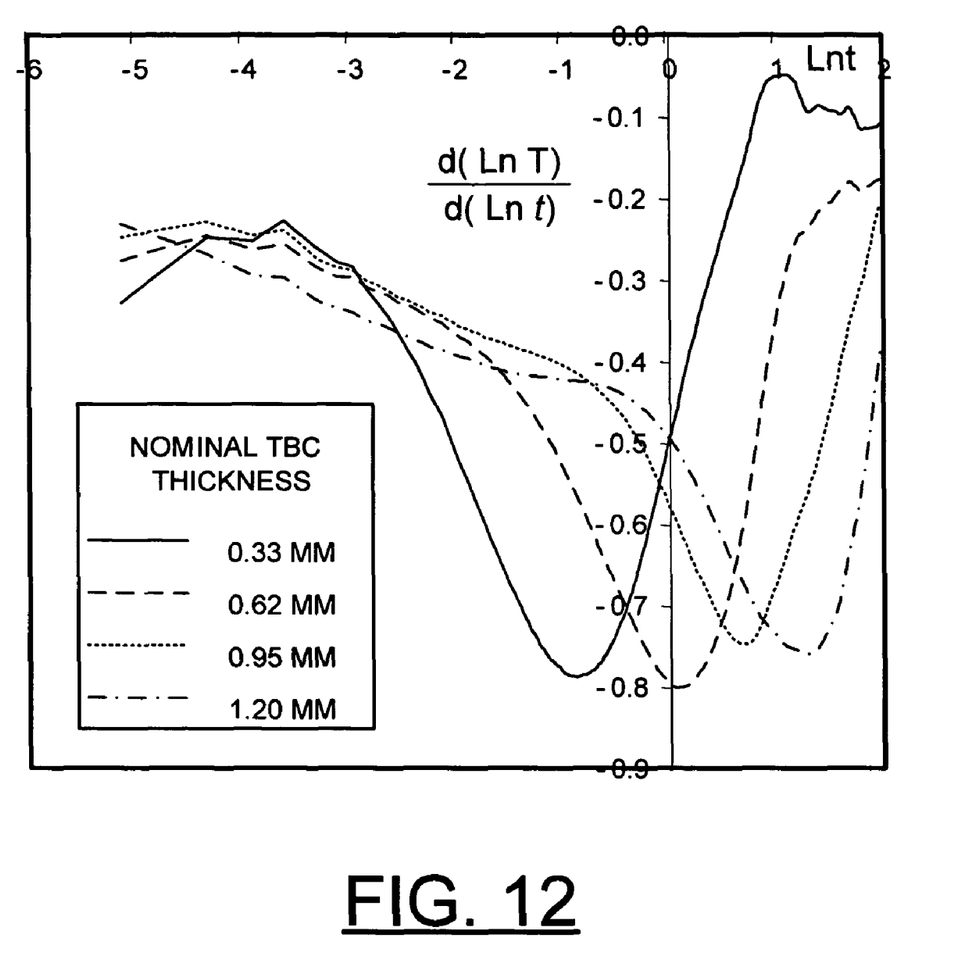
FIG. 12 is a graph illustrating measured surface-temperature-slope data for TBCs of different thickness in accordance with the preferred embodiment.

FIG. 12 shows measured surface-temperature slopes from the 4 thickness sections of this TBC specimen. Compared with the theoretical results in FIG. 9, the data in FIG. 12 indicate clearly the difference of TBC thickness in these 4 sections.

While the present invention has been described with reference to the details of the embodiments of the invention shown in the drawing, these details are not intended to limit the scope of the invention as claimed in the appended claims.

What is claimed is:

1. A computer-implemented method for automated analysis of thermal imaging data for multi-layer materials comprising the steps of:
    a computer for
    storing a plurality of model solutions for a multi-layer material system;
    acquiring experimental thermal imaging data; said experimental thermal imaging data including test and sample parameters, said test and sample parameters including a heat capacity of each layer of the multi-layer materials;
    fitting a model solution with the experimental thermal imaging data by adjusting the model parameters including thermal properties and thickness of each layer;
    responsive to the model result matching the experimental thermal imaging data, identifying thermal properties and thickness parameters for the multi-layer materials; and
    responsive to the identified thermal properties and thickness parameters for the multi-layer materials, constructing thickness, thermal conductivity, and absorption maps for the multi-layer materials.

2. A computer-implemented method for automated analysis of thermal imaging data as recited in claim 1 further includes solving a theoretical model for a multi-layer material system.

3. A computer-implemented method for automated analysis of thermal imaging data as recited in claim 2 wherein acquiring experimental thermal imaging data further includes reading said test and sample parameters, said test and sample parameters include imaging rate for the experimental thermal imaging data.

4. A computer-implemented method for automated analysis of thermal imaging data as recited in claim 3 wherein said test and sample parameters include a number of layers, and for each layer of the multi-layer materials including a layer thickness, said heat capacity, and a layer conductivity.

5. A computer-implemented method for automated analysis of thermal imaging data as recited in claim 1 wherein the step of fitting a model solution with the experimental thermal imaging data by adjusting the model parameters including thermal properties and thickness of each layer includes least-square fitting of a model solution with said experimental thermal imaging data.

6. A computer-implemented method for automated analysis of thermal imaging data as recited in claim 1 wherein the step of fitting of a model solution with experimental thermal imaging data is used to determine thermal properties including conductivity and heat capacity.

7. A computer-implemented method for automated analysis of thermal imaging data as recited in claim 1 wherein the step of fitting of a model solution with experimental thermal imaging data is used to determine absorption coefficient.

8. A computer-implemented method for automated analysis of thermal imaging data as recited in claim 1 wherein the step of acquiring experimental thermal imaging data includes each layer being discretized into a plurality grids.

9. A computer-implemented method for automated analysis of thermal imaging data as recited in claim 8 further includes automatically selecting time steps from the inputted experimental thermal imaging data to be analyzed.

10. A computer-implemented method for automated analysis of thermal imaging data as recited in claim 9 further includes a measured time series of surface temperature at each pixel being fitted to a stored numerical solution to obtain best-fit parameters.

11. A computer-implemented method for automated analysis of thermal imaging data as recited in claim 10 wherein said best-fit parameters provide conductivity and thickness.

12. A computer-implemented method for automated analysis of thermal imaging data as recited in claim 10 wherein said best-fit parameters provide absorption coefficient.

13. A computer-implemented method for automated analysis of thermal imaging data as recited in claim 1 wherein the step of acquiring experimental thermal imaging data includes providing variable time steps and nonuniform grid sizes in different material layers.

14. A computer-implemented method for automated analysis of thermal imaging data as recited in claim 1 wherein the step of acquiring experimental thermal imaging data includes incorporating finite flash duration and volume heat absorption effects.

15. Apparatus for automated analysis of thermal imaging data for multi-layer materials from one-sided pulsed thermal imaging comprising:
    a data acquisition and control computer, said data acquisition and control computer storing a plurality of model solutions for a multi-layer material system;
    said data acquisition and control computer for performing the steps of: acquiring experimental thermal imaging data; said experimental thermal imaging data including test and sample parameters, said test and sample parameters including a heat capacity of each layer of the multi-layer materials; fitting a model solution with the experimental thermal imaging data by adjusting the model parameters including thermal properties and thickness of each layer; and responsive to the model result matching the experimental thermal imaging data, identifying thermal properties and thickness parameters for the multi-layer materials; and responsive to the identified thermal properties and thickness parameters for the multi-layer materials, constructing thickness, thermal conductivity, and absorption maps for the multi-layer materials.

16. Apparatus for automated analysis of thermal imaging data for multi-layer materials as recited in claim 15 wherein the step of fitting of a model solution with experimental thermal imaging data is used to determine thickness, conductivity, heat capacity, and absorption coefficient.

17. Apparatus for automated analysis of thermal imaging data for multi-layer materials as recited in claim 15 includes said data acquisition and control computer for performing the step of acquiring experimental thermal imaging data includes reading test and sample parameters; said test and sample parameters including an imaging rate, a number of layers, a layer thickness, said heat capacity, and a layer conductivity.

18. Apparatus for automated analysis of thermal imaging data for multi-layer materials as recited in claim 15 wherein the step of fitting a model solution with the experimental thermal imaging data by adjusting the model parameters including thermal properties and thickness of each layer includes least-square fitting of a model solution with said experimental thermal imaging data.

* * * * *